(12) United States Patent
Khan et al.

(10) Patent No.: US 10,984,834 B2
(45) Date of Patent: Apr. 20, 2021

(54) DUAL CONTROL SECURITY PROCESSING

(71) Applicant: NCR Corporation, Atlanta, GA (US)

(72) Inventors: Sudip Rahman Khan, Decatur, GA (US); Matthew Robert Burris, Atlanta, GA (US); Christopher John Costello, Suwanee, GA (US); Gregory Joseph Hartl, Atlanta, GA (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 16/774,351

(22) Filed: Jan. 28, 2020

(65) Prior Publication Data

US 2020/0327910 A1 Oct. 15, 2020

Related U.S. Application Data

(63) Continuation-in-part of application No. 16/696,870, filed on Nov. 26, 2019, and a continuation-in-part of application No. 16/382,946, filed on Apr. 12, 2019.

(51) Int. Cl.
| | |
|---|---|
| *G11B 27/10* | (2006.01) |
| *G06N 20/00* | (2019.01) |
| *H04N 7/18* | (2006.01) |
| *G06K 9/00* | (2006.01) |

(52) U.S. Cl.
CPC .......... *G11B 27/10* (2013.01); *G06K 9/00711* (2013.01); *G06N 20/00* (2019.01); *H04N 7/181* (2013.01); *H04N 7/183* (2013.01); *G06K 2009/00738* (2013.01)

(58) Field of Classification Search
CPC ....... G08B 13/19656; H04N 7/18; G07C 9/27

USPC ........................................ 340/5.53
See application file for complete search history.

(56) References Cited

U.S. PATENT DOCUMENTS

| | | | | |
|---|---|---|---|---|
| 2010/0026802 | A1* | 2/2010 | Titus | G08B 13/19613 |
| | | | | 348/143 |
| 2013/0017812 | A1* | 1/2013 | Foster | H04N 7/186 |
| | | | | 455/417 |
| 2014/0098235 | A1* | 4/2014 | Cusack, Jr. | G07C 9/27 |
| | | | | 348/156 |
| 2016/0267759 | A1* | 9/2016 | Kerzner | G08B 25/009 |
| 2019/0260926 | A1* | 8/2019 | Kimball | H04N 5/23293 |

* cited by examiner

*Primary Examiner* — Fabricio R Murillo Garcia
(74) *Attorney, Agent, or Firm* — Schwegman, Lundberg & Woessner

(57) ABSTRACT

A dual-control security procedure is initiated, and a first person is identified for the procedure. The first person is authenticated and a remote agent that is remotely located is requested to participate in the procedure. Actions/behaviors of at least the first person are monitored from the video in accordance with the procedure and provided in real-time to the remote agent. An audit log is written to upon the conclusion of the procedure. The audit log at least comprising: identifiers for the first person and the remote agent, a procedure identifier for the procedure, an asset/area identifier associated with the procedure, a zone identifier for a location within an establishment, action identifiers for the actions, behavior identifiers for the behaviors, violation identifiers for any violations detected during the procedure, and a link to a video clip from the video that corresponds to at least the first person performing the procedure.

20 Claims, 4 Drawing Sheets

DUAL CONTROL SECURITY PROCESSING

RELATED APPLICATIONS

The present application is a Continuation-In Part (CIP) of co-pending application Ser. No. 16/382,946 filed Apr. 12, 2019 and entitled "Secure Zone Access Control" and co-pending application Ser. No. 16/696,870 filed Nov. 26, 2019 and entitled: "Frictionless and Autonomous Control Processing;" the disclosures of which in their entireties are incorporated by reference herein.

BACKGROUND

Although authentication techniques have evolved and are deployed with a variety of different technologies, there remains many areas of business that have had relatively few authentication-based improvements.

For example, a bank branch has security and audit procedures that remain substantially manual and rely on trusted human relationships based on the bank personnel. To minimize reliance on personnel, many bank procedures require two individuals to be present to gain access to designated areas/assets of the bank branch. The belief is that it is more difficult and more unlikely that theft will occur if multiple designated employees are both required to gain access to a secure area/asset of the bank (such as the safe or cabinet access to an Automated Teller Machine (ATM)). The two-person requirement also improves the accuracy and reliability of auditing by the bank when theft is detected.

However, the two-person access requirement creates substantial interruptions during work hours to the personnel. When one employee has a legitimate need to access a secure area/asset of the bank, another authorized or designated employee has to be physically present to provide the access. This means that the second employee is disrupted and must stop working and physically accompany the employee that needs access. Still further, banks require all secure area/asset access events be manually logged upon access, when access is completed, and audited upon closing each business day. So, the employees that were required for the secure area/asset access must also make entries into and validate an audit log for the area/asset.

If the designated employees are out of the office when another employee needs area/asset access, then the requesting employee may not gain access to the area/asset. This means that banks must ensure that designated employees are always present during business hours, which is not easy to achieve when sicknesses and unexpected events arise for the designated employees.

SUMMARY

In various embodiments, methods and a system for dual control security processing are presented.

According to an embodiment, a method for dual control security processing is presented. An event associated with initiation of dual control policies is detected. An individual associated with an access of a secure asset, a secure zone, or performance of a specific type of transaction. A remote agent that is remote from the individual is engaged as a monitor for the access in accordance with the dual control security policies. At least real-time video of at least the individual is captured during performance of the access. The real-time video is provided to the remote agent. Actions and behaviors of at least the individual are recorded from the video in an audit data set until the access is completed.

DETAILED DESCRIPTION

Figure 1:
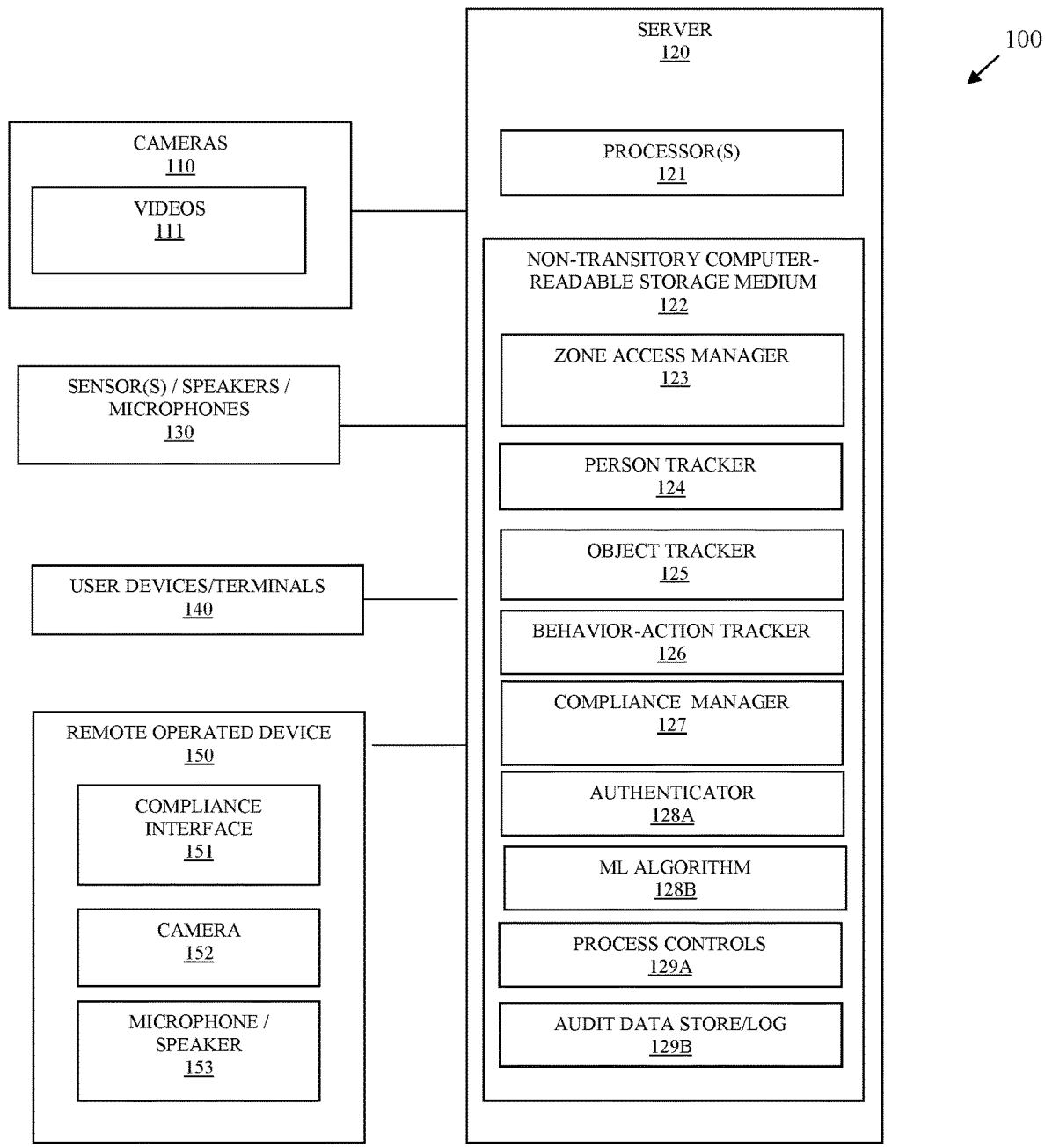
FIG. 1 is a diagram of a system for dual control security processing, according to an example embodiment.

FIG. 1 is a diagram of a system 100 for dual control security processing according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of dual control security processing, presented herein and below.

System 100 provides mechanism by which dual control security policies can be validated, logged, and monitored by a remote individual/agent. Actions taken during access to an asset or a zone are logged and compared against what is required by the policies. In an embodiment discussed herein, the monitoring person is remotely located from the asset or zone and operates a remote device. In an embodiment discussed herein, the monitoring entity is a fully automated remote agent. Any violations or issues detected during access are fully documented, indexed, and linked to video 111 depicting the violations or issues.

As used herein and below, the terms "user," "personnel," "actor," "person," "individual," and "subject" may be used interchangeably and synonymously. The terms refer to an individual detected within a monitored area within an establishment.

An "remote agent" or "agent" refers to an automated process or an individual that is remotely located from where the dual control access is being performed.

The term "zone" refers to a predefined area or an enterprise that is being monitored within images captured by cameras/video cameras. The entire area may be monitored through the images or just pre-designated objects within portions of the area.

A "business process," as used herein, refers to a set of predefined actions required in performance of a predefined business procedure/process of an establishment. A "set of predefined actions" may also be referred to herein as "activities."

An "object" refers to a secure asset, a non-secure asset, and/or a structure located within the establishment. The object may include drawers, computers, keys, cash, checks, tables, security panels, chairs, windows, notary stamps, doors, documents, terminals, countertops, shelving, money, checks, safety deposit boxes, items being sold within the establishment, etc. that are being monitored within the image frames of one or more videos provided in video feeds.

"Dual control" refers to a security procedures or policies associated with accessing a secure asset of an establishment or accessing a secure zone of the establishment. The security procedure requires a person that is granted access to or is attempting to the access an asset or a zone be monitored in real time by a second person who verifies the person with access adheres to specific actions during the access that conform to the security procedures or policies.

System 100 includes a plurality of cameras 110 that capture time-stamped videos 111 of persons and objects outside and on a premise of an establishment and within the establishment. System 100 includes user devices/terminals 140 used to process transactions associated with the establishment and a remote operated device 150 operated by a remote individual. System 100 also includes sensors, speakers, and microphones 130 dispersed throughout the establishment and/or integrated into other devices, such as terminals 140.

Moreover, system 100 also includes server 120. Server 120 includes executable instructions that execute on one or more hardware processors 121 of server 120 from a non-transitory computer-readable storage medium 122 as: zone access manager 123, person tracker 124, object tracker 125, behavior-action tracker 126, compliance manager 127, authenticator 128A, and remediation manager 128B.

Non-transitory computer-readable-storage medium 122 of server 120 also includes the process controls 129A and an audit store or audit log 129B.

Process controls 129A represents a data structure comprising and embodying business rules associated with pre-defined business actions or tasks required by an establishment during access to a secure asset or a secure zone, the actions or tasks are associated with dual control security policies. The data structure includes statements of zone area identifiers, asset/object identifiers, action identifiers, behavior identifiers, security role identifiers for security roles and responsibilities, transaction data identifiers for types of transaction data required for any given task (when a transaction is taking place or is a monitored set of activities), task identifiers that identify specific tasks, and conditions that defines rules. Each rule identifying a task and required actions, behaviors, and any transaction information, audit information, or business operation information for that task. Tasks can be required, permissible but not required, and/or impermissible/prohibited. The sequence of the tasks may also be defined within the conditions for the rules. Each rule may also include a resource identifier or a processing action that is to be processed when a given rule is violated. The resource associated with the resource identifier may be an automated application, a system, or an electronic contact address of an individual.

A given "task" may also be referred to as a set of predefined activities or activities.

It is to be noted that there may be multiple servers 120, such that the different elements 123-128A-B may execute on a same server 120 or multiple different servers 120 networked together within a cloud processing environment.

Cameras 110 are preconfigured to capture videos 111 of areas that are inside and outside the establishment based on the field-of-view of the lenses of cameras 110. Some of cameras 110 may capture video 111 representing portions of a different area than a different one of the cameras 110 captures video 111 for. That is, each video 111 can include frames that may overlap multiple ones of the defined areas covered in the field-of-view of a different camera 110. Some area identifiers may be associated with zones that are subject to dual control security policies.

In an embodiment, the cameras 110 can be situated at different angles and heights within the areas where they are located. Some cameras 110 may be at waist level, chest level, or head level to an average sized person and directed in different directions upward or downward slightly for purposes of capturing the eyes of individuals within the room. Additionally, there may be one or more overhead cameras 110 both inside and outside the establishment. Some cameras 110 may be specifically calibrated to capture eyes and faces of the individuals.

Initially, cameras 110 are situated in locations throughout the establishment and some of the one or more cameras 110 may situated on the outside of the establishment to capture the egress and ingress point of the establishment and optionally to capture a parking lot associated with the establishment Each camera lens configured to cover one or more predefined areas both inside and outside the establishment.

Furthermore, metadata is assigned to each camera 110 to include a unique camera identifier, a location identifier (representing the physical location that camera 110 is situated), and one or more area identifiers (representing the predefined areas that the lens and field-of-view of camera 110 captures in the video 111—again, some area identifiers are associated with zones subject to dual control security policies defined in process controls 129A).

Terminals/user devices 140 comprise processing devices that are operated by employees and/or customers of the establishment during transactions, when performing electronic business operations, and/or when obtaining information or providing information. Transactions may comprise processing actions initiated by the employees in performance of a portion of a task associated with the establishment. Devices 140 may also include user-operated mobile devices, such as phones, tablets, and/or wearable processing devices.

Remote operated device 150 includes its own processor and non-transitory computer-readable storage medium comprising executable instructions representing a compliance interface 151. Remote operated device 150 may also comprise an integrated or interfaced camera 152 and an integrated microphone/speaker 153. It is to be noted that remote operated device 150 is illustrated as a different device from devices/terminals 140 but this does not have to be the case. In fact, remote operated device 150 may be a same type of device as device/terminal 140. This was done for convenience to illustrate that a remote individual operates compliance interface 151 from remote operated device 150; however, it can also be the case that a user-mobile device and/or a transaction terminal is operated by the remote individual and such device 140 includes compliance interface 151 and is interfaced, optionally, to a camera and microphone/speaker.

Zone access manager 123 receives transaction identifiers or activity identifiers from terminals 140 as well as operation identifiers for operations being performed and parameter data supplied as input to the operations by the employees or customers during transactions or activities at terminals 140. Zone access manager 123 may also receive person identifiers from person tracker 124 when a person is detected within a secure zone. Furthermore, zone access manager 123 may receive object identifiers from object tracker 125 when a secure asset/object is identified. Still further, zone access manager 123 may receive a person identifier and/an access identifier when an individual is attempting to authenticate for access to a secure zone or secure asset through authenticator 128A.

Zone access manager 123 supplies transaction identifiers, person/individual identifiers, object identifiers, zone identifiers, asset identifiers, operation identifiers, and parameter data as transaction information and/or activity information to compliance manager 127 in real time as transactions are being processed on terminals 140 and/or as activities are taken place with a secure asset or within a secure zone.

Person tracker 124 analyzes pixels in video frames of video feeds 111 and uses a bounding box or region of interest within the pixels to track locations of the individuals and extremities (arms, hands) of the individuals within a known area of the establishment based on the area identifiers associated with cameras 110.

Object tracker 125 monitors the structures and assets within the establishment via bounding boxes or regions of interest within pixels of the image frames for the video feeds 111.

Behavior-action tracker 127 utilizes the bounding boxes associated with each individual and the objects to perform more detailed pixel analysis on facial features of the individuals and identify behaviors identified by specific behavior identifiers. Moreover, location information within the pixels for the bounding boxes of the individuals and the objects are used by behavior-action tracker 127 to identify actions that corresponding to action identifiers.

Metadata associated with frames of the video 111 permit zone access manager to identify locations within an establishment of each person/individual provided by person tracker 124 and each object provided by object tracker 125. Locations within the establishment associated with secure zones are identified as are object identifiers that correspond to secure assets. Moreover, transaction information identifies locations of terminals 140.

Zone access manager 123 identifies when a secure zone, a secure asset, or a specific type of transaction (based on transaction information reported by terminals 140) is being accessed or processed. Each zone, asset, and specific type of transaction is linked to a process control 129A. Zone access manager 123 raises an event or uses and Application Programming Interface (API) to invoice compliance manager 127 in such situations. It may also be the case that zone access manager 123 identifies an attempted access to a secure asset or a secure zone based on an authentication request that is being processed by authenticator 128A for which Authenticator 128A raises an event.

Compliance manager 127 utilizes any transaction information or activity information supplied by terminals 140 and/or user devices 150 and location information of the bounding boxes for the each individual within or on a premises of the establishment against known locations within the establishment with: person identifiers provided by person tracker 124, the object identifiers provided by object tracker 125, action identifiers provided by behavior-action tracker 126, and behavior identifiers provided by tracker 126 to evaluate the appropriate process control 129A.

Process control 129A may identifying within its conditions/rules a type of individual (based on security role) authorized to serve as a remote individual to visually witness and attest to proper security policies being followed by an individual associated with a dual control access of an asset, zone, or type of transaction. The type of individual or security role is used to access an internal database and obtain contact and device information for a specific remote individual. A request to monitor the dual control access request is sent in real time to the corresponding remote operated device 150 through compliance interface 151. The remote individual is requested through compliance interface 151 to authenticate with credentials for witnessing and attesting to the dual control access activity of the requesting or accessing individual through authenticator 128A. Assuming the remote individual successfully authenticates, compliance manager streams in real time video 111 corresponding to the accessing individual (individual that initiated the dual control access through his/her actions—location within a secure zone, possession of a secure asset, processing a specific type of transaction, or attempting to access a zone or asset through authenticator 128A).

During access within the zone, handling an asset, or processing a specific type of transaction, camera 152 may capture eye movements and focus of the remote individual in video frames and audio spoken at remote device 150 in audio snippets. Compliance manager 152 may use the video frames and audio snippets to determine whether remote individual is looking at a display screen where the accessing individual is performing an activity associated with the dual control access. An audible alert or popup message may be presented to the remote individual when focus and attention to the video of the accessing individual is below a predefined threshold of attentiveness (such as not looking at the displayed video for more than N seconds, conversing with someone in the vicinity during the video, etc.). Compliance interface 151 may also randomly ask questions through popup windows asking whether the accessing individual is performing the appropriate actions based on what is defined in the corresponding process control 129A. In cases, where the dual control access relates to a transaction any transaction information generated by terminals 140 in performance of that transaction are presented in real time by compliance manager 127 on the display screen of remote device 150 along with the real-time video 111 of the accessing individual performing the transaction.

Compliance manager 127 is simultaneously monitoring actions of the accessing individual through the video frames, any audio captured by speakers 130, any events raised by sensors 130, and any transaction information provided by terminals 140. The accessing individual is monitored for compliance with the appropriate actions and behaviors defined in the corresponding process control 129A.

In an embodiment, the accessing individual (the individual that is to be monitored for the dual control access) may request a specific remote individual for the monitoring via an interface associated with device/terminal 140. Compliance manager 127 verifies the requested remote individual has the appropriate security role for such oversight via control policy 129A and sends the request through compliance interface 151. Once authenticator 128A verifies the remote individual accepted and is prepared to monitor the accessing individual, compliance manager 127 sends an acceptance and verification to the accessing individual through device/terminal 140.

From initiation of the dual control access through the last action associated with that access, compliance manager 127 logs a variety of audit data. The audit data is tagged and may include: date and time stamps, dual control access identifier, transaction type identifier, asset identifier, zone identifier, accessing individual identifier, remote individual identifier, remote device 150 identifier, device/terminal 140 identifier, transaction identifiers, transaction information, activity information, action identifiers, behavior identifiers, elapsed time for each action identifier, any violation identifiers linked to specific violation types that violate a required action as defined in process control 129A, process control 129A identifier, a link to a video clip of video 111 that corresponds the dual control access indexed to the action identifiers/behavior identifier/violation identifiers, confirmatory responses received from remote individual through compliance interface 151, any violations detected through any monitoring of the remote individual through video provided by camera 152 and audio through microphone 153, and other user-defined audit information defined within processing control 129A. Compliance manager 127 indexes and stores the information recorded as dual control access audit session data in audit data store/log 129B.

In an embodiment, the dual control access audit session data is provided as input to a machine-learning (ML) algorithm 128B along with the corresponding video 111 (and video from camera 152 when applicable), any audio (captured by microphone 130 and/or microphone 153), transaction/activity information. Subsequently determined fraud situations or violations that occurred during the dual control access session based on subsequent analysis is also provided with the input as expected results for the dual control access audit session. This is used to train the ML algorithm 128B for identifying fraud and violations of dual control security policies independent of any remote individual.

In an embodiment, a fully trained ML algorithm 128B is processed as a remote agent for subsequent dual control access sessions of an accessing individual. The remote agent replaces any required remote individual or in some cases can be used as a control of remote individuals to determine how effective remote individuals are at verifying dual control access associated with secure assets, secure zones, and specific transaction types within an establishment.

In an embodiment, compliance manager 127 simultaneously streams the dual control access audit session to both the remote device and to a third-party auditor's device, which serves as a control with respect to the effectiveness of the remote individual.

In an embodiment, the dual control access audit session data is integrated into other financial business organizational data systems for purposes of process improvement and improving security policies within the establishment.

When a violation is detected, compliance manager 127 may invoke remediation actions defined within the corresponding processing control 129A. The remediation action may include sending alerts to security systems, audit systems, specific personnel within the establishment. Remediation actions may also include sending a link for a real-time stream of an ongoing dual control access audit session to specific personnel, locking down a specific account, locking out access of a specific employee to establishment resources, dispatching an individual to a location associated with the dual control access audit session, and other actions that can be identified via a remediation identifier within the corresponding processing control 129A for customized and automated processing by compliance manager 127.

Some example situations that utilize system 100 are now discussed for further illustration of the embodiments discussed herein.

In a first example scenario, system 100 determines initiation of a dual control access session (this can be automatically decided as discussed above or initiated by an individual through a request as was also discussed above). Behaviors and actions of the individuals are monitored (can be customer of the establishment or a staff member of the establishment), the behaviors, actions, with respect to a predefined transaction type, a secure zone, or a secure asset can trigger the dual control access session. Alternatively, a notification at the beginning of a business process can be made by staff before a dual access control session begins via any staff operated device or based on an authentication attempt. Live video feeds are streamed showing the staff, assets, and/or zone to a remote operated device of a remote individual serving as a control to the business process. In some cases, the video feeds are also streamed in real time to a third party monitor and/or security officer. The remote individual monitors the video and documents through a compliance interface the business process as it proceeds in the dual access control session. When the business process completes, validation of security procedures are confirmed, the audit session log data (fully tagged and indexed) is made available to other establishment systems. Potential violations or issues with the business process are document and enabled as labeled/tagged data sets. In an embodiment, the tagged data and other business transaction data are combined to provide a broader context and relationship of the dual control access session to other dual control access sessions and the business's operations data. The tagged data sets may be used to further train staff on the proper way to perform the business process and as a means of detecting fraud or violations during the business process. Any fraudulent actions later determined to have taken place result in the tagged data sets to be updated and used to refine system 100 for detection of such actions in subsequent iterations of system 100. The tagged data sets and integrated operations data is made available to staff at various levels of the establishment for support activities with respect to the business process.

In a second example scenario, system 100 utilizes the tagged data sets and the subsequently determined results having violations, no violations, and fraud detected to train a machine-learning algorithm. Over time, the machine-learning algorithm can replace the remote individual that monitors the dual control access.

In a third example scenario, system 100 utilizes both the remote individual and the trained machine-learning algorithm to monitor dual control access. Any violations caught by the remote individual but not the machine-learning algorithm are used to retrain the machine-learning algorithm for continuous learning and improvement. Further, violations caught by the machine-learning algorithm but not the remote individual are used to train the remote individual on what was missed.

A variety of scenarios are possible with system 100 to determine such things as ensuring doors are shut, drawers are locked, mobile device wireless capabilities are deactivated, windows are shut, etc. The sensor data may server as input to compliance manager 127 and sensor identifiers and reported states may be defined within the conditions of the process controls 129A.

Person tracker 124 may be equipped with biometric recognition, such that facial features of the individuals being tracked can be derived from the pixels of the video frames and matched to a registered individual or the enterprise. An enterprise identifier for the individual may then be recorded within the security log with the security log entries. For example, facial recognition may ensure that the individuals are the expected authorized employees performing the audit tasks or procedures of the establishment.

It is noted that other biometric features may be used as well, such as and by way of example only, a fingerprint provided by a security system indicating that the individual was authenticated for performing a given task, a retina scan, a digit distance and length measurement, a palm reader, a voice print (captured by a microphone 130), etc. Additionally, features from the video feeds 111 do not have to only include facial features and can include any combination of features or a single set of features associated with the individuals: gait, extremity length, height, and/or facial features.

In an embodiment, compliance manager 127 listens for keywords spoken an individual captured from microphones 130. When a keyword associated with distress is spoken, compliance manager 127 raises a silent alarm and may notify one or more other individuals associated with the establishment.

In an embodiment, compliance manager 127 may utilize speakers/microphones 130 and/or speakers/microphone 153 with a speech-to-text and text-to-speech functions allowing compliance manager 127 to interactively engage the accessing individual and/or remote individual to provide natural language instructions and feedback regarding the proper dual control security policies that each should be following and how to correct any detected violations during a dual control access session.

In an embodiment, compliance manager 127 maintains metrics associated with employees performing tasks (including transactions), such as time associated with a given task as a whole, time associated with a given action of a task, time associated with a given set of actions of a task, etc. Compliance manager 127 may then provide an interface for searching, reporting, and mining the metrics. This can be used for continuous process improvements associated with the tasks, non-reputable evidence of non-compliance infractions associated with a given employee, and/or for employee evaluation and discipline.

The above-noted embodiments and other embodiments are now discussed with reference to FIGS. 2-4.

Figure 2:
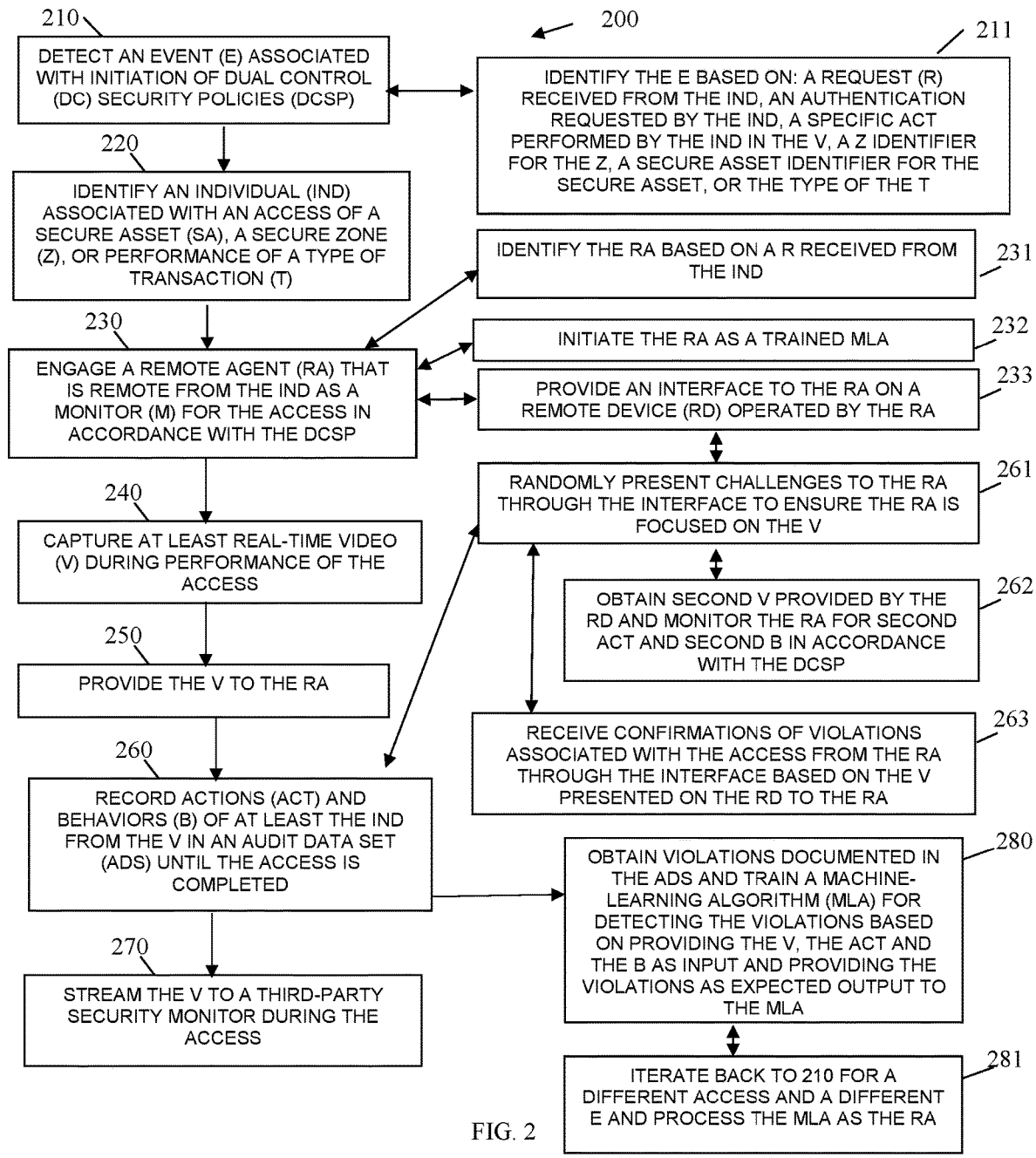
FIG. 2 is a diagram of a method for dual control security processing, according to an example embodiment.

FIG. 2 is a diagram of a method 200 for dual control security processing, according to an example embodiment. The software module(s) that implements the method 200 is referred to as a "dual control security monitor." The dual control security monitor is implemented as executable instructions programmed and residing within memory and/or a non-transitory computer-readable (processor-readable) storage medium and executed by one or more processors of a device. The processor(s) of the device that executes the dual control security monitor are specifically configured and programmed to process the dual control security monitor. The dual control security monitor may have access to one or more network connections during its processing. The network connections can be wired, wireless, or a combination of wired and wireless.

In an embodiment, the device that executes the dual control security monitor is server 120. In an embodiment, server 120 is a cloud-based server, a local-area network (LAN)-based server, or a wide-area network (WAN) server.

In an embodiment, the dual control security monitor is all or some combination of: zone access manager 123, person tracker 124, object tracker 125, behavior-action tracker 126, compliance manager 127, authenticator 128A, and/or ML algorithm 128B.

In an embodiment, dual control security monitor interacts with compliance interface 151.

At 210, the dual control security monitor detect an event associated with initiation of dual control security policies.

In an embodiment, at 211, the dual control security monitor identifies the event based on: a request received from an individual, an authentication requested by the individual, a specific action performed by the individual, a zone identifier for a zone within the establishment, a secure asset identifier for a secure asset, or a type of transaction that is attempting to be processed by the individual.

At 220, the dual control security monitor identify an individual associated with an access to a secure asset, a second zone, or performance of a type of transaction.

At 230, the dual control security monitor engages a remote agent that is remote from the individual as a monitor for the access in accordance with the dual control security policies.

In an embodiment, at 231, the dual control security monitor identifies the remote agent based on a request received from the individual.

In an embodiment, at 232, the dual control security monitor initiates the remote agent as a trained machine-learning algorithm.

In an embodiment, at 233, the dual control security monitor provides an interface to the remote agent on a remote device operated by the remote agent. In an embodiment, the interface is the compliance interface 151 and the remote device is the remote device 150.

At 240, the dual control security monitor captures at least real-time video during performance of the access by the individual. Other data may be provided as well as was discussed above, such as, but not limited to: audio data, sensor data, transaction data, activity data, and others.

At 250, the dual control security monitor provides the video in real time to the remote agent.

At 260, the dual control security monitor records at least actions and behaviors of at least the individual from the video in an audit data set until the access is completed by the individual.

In an embodiment of 233 and 260, at 261, the dual control security monitor randomly presents challenges to the remote agent through the interface to ensure the remote agent is focused on the video and the actions and behaviors of the individual during the access by the individual.

In an embodiment of 261 and at 262, the dual control security monitor obtains second video provided by the remote device and monitors the remote agent for second actions and second behaviors in accordance with the dual control security policies.

In an embodiment of 261 and at 263, the dual control security monitor receives confirmations of violations associated with the access (as defined by the dual control security policies) from the remote agent through the interface based on the video presented on the remote device to the remote agent.

In an embodiment, at 270, the dual control security monitor streams the video to a third-party security monitor during the access as an additional security check on the access beyond that which is provided by the remote agent.

In an embodiment, at 280, the dual control security monitor obtains violations documents in the audit data set and trains a ML algorithm for detecting the violations based on providing the video, the actions, and the behaviors as input to the ML algorithm and providing the violations as expected output to the ML algorithm.

In an embodiment of 280 and at 281, the dual control security monitor iterates back to 210 for a different access and a different event and processes the ML algorithm as the remote agent.

Figure 3:
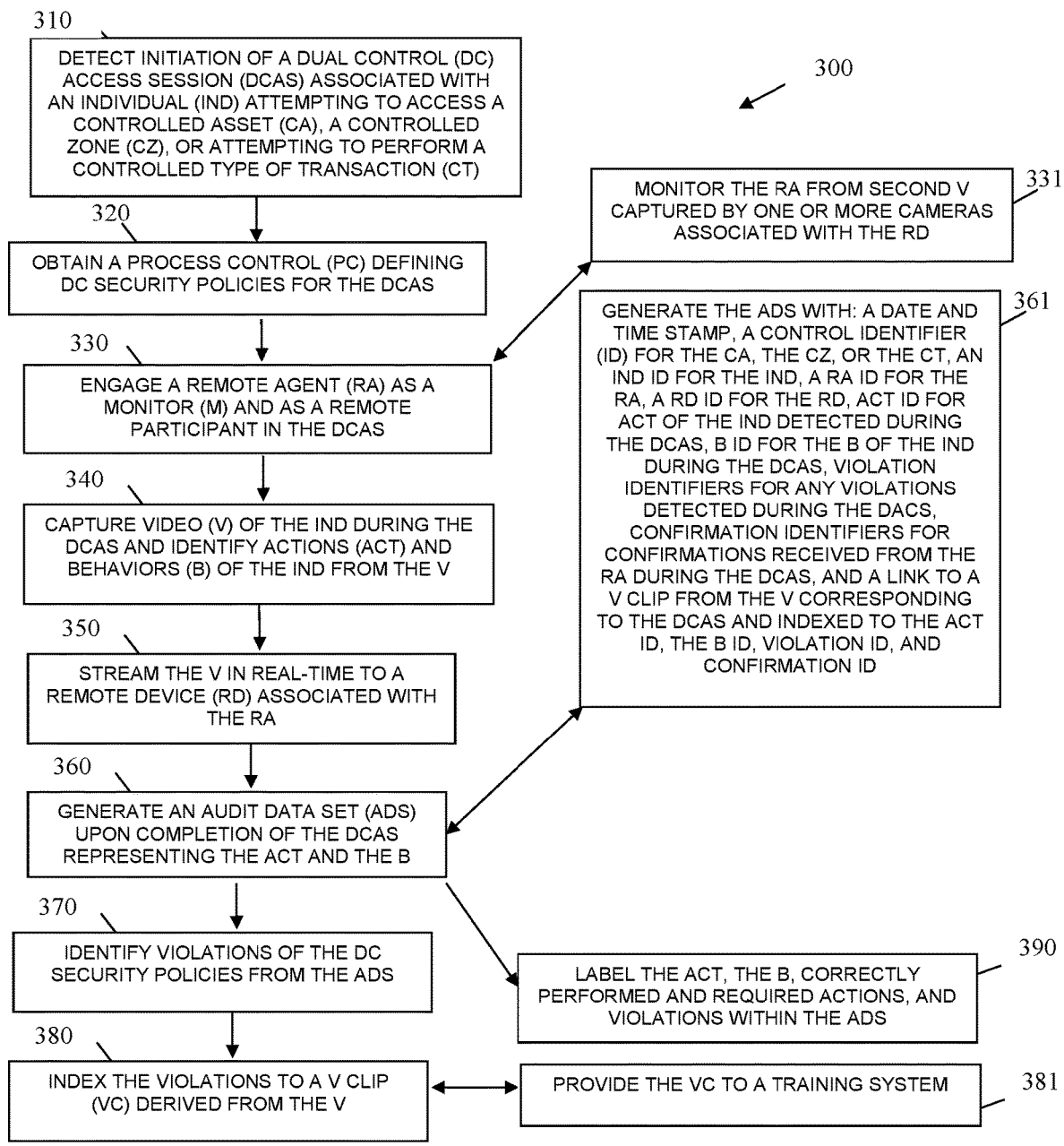
FIG. 3 is a diagram of another method for dual control security processing, according to an example embodiment.

FIG. 3 is a diagram of another method 300 for dual control security processing, according to an example embodiment. The software module(s) that implements the method 300 is referred to as a "dual control remote manager." The dual control remote manager is implemented as executable instructions programmed and residing within memory and/or a non-transitory computer-readable (processor-readable) storage medium and executed by one or more processors of a device. The processors that execute the dual control remote manager are specifically configured and programmed to process dual control remote manager. The dual control remote manager may have access to one or more network connections during its processing. The network connections can be wired, wireless, or a combination of wired and wireless.

In an embodiment, the device that executes the dual control remote manager is the server 120. In an embodiment, the server 120 is a cloud processing environment, a LAN server, or a WAN server.

In an embodiment, the dual control remote manager is all of or some combination of: zone tracker 123, person tracker 124, object tracker 125, behavior-action tracker 126, compliance manager 127, authenticator 128A, ML algorithm 128B, and/or the method 300.

In an embodiment, the dual control remote manager interacts with compliance interface 151.

The dual control remote manager presents another and, in some ways, enhanced processing perspective of the method 200 discussed above.

At 310, the dual control remote manager detects initiation of a dual control access session associated with an individual attempting to access a controlled asset, a controlled zone, or attempting to perform a controlled type of transaction.

At 320, the dual control remote manager obtains a process control defining security policies for the dual control access session. In an embodiment, the process control is process control 129A.

At 330, the dual control remote manager engages a remote agent as a monitor and as a remote participant in the dual control access session.

In an embodiment, at 331, the dual control remote manager monitors the remote agent from second video captured by one or more cameras associated with the remote device of the remote agent.

At 340, the dual control remote manager captures video of the individual during the dual control access session and identifies actions and behaviors for the individual during the session from the video.

At 350, the dual control remote manager streams the video in real time to the remote device associated with the remote agent.

At 360, the dual control remote manager generates an audit data set upon completion of the dual control access session representing at least the actions and the behaviors of the individual during the session.

In an embodiment, at 370, the dual control remote manager identifies violations the dual control security policies from the audit data set.

In an embodiment of 370 and at 380, the dual control remote manager indexes the violations to a video clip derived from the video and corresponding to the session.

In an embodiment, at 381, the dual control remote manager provides the video clip to a training system to train personal to focus on specific actions and specific behaviors to detect specific violations of the security policies.

In an embodiment, at 390, the dual control remote manager labels the actions, the behaviors, correctly performed and required actions as identified from the process control, and violations as identified from the process control within the audit data set.

Figure 4:
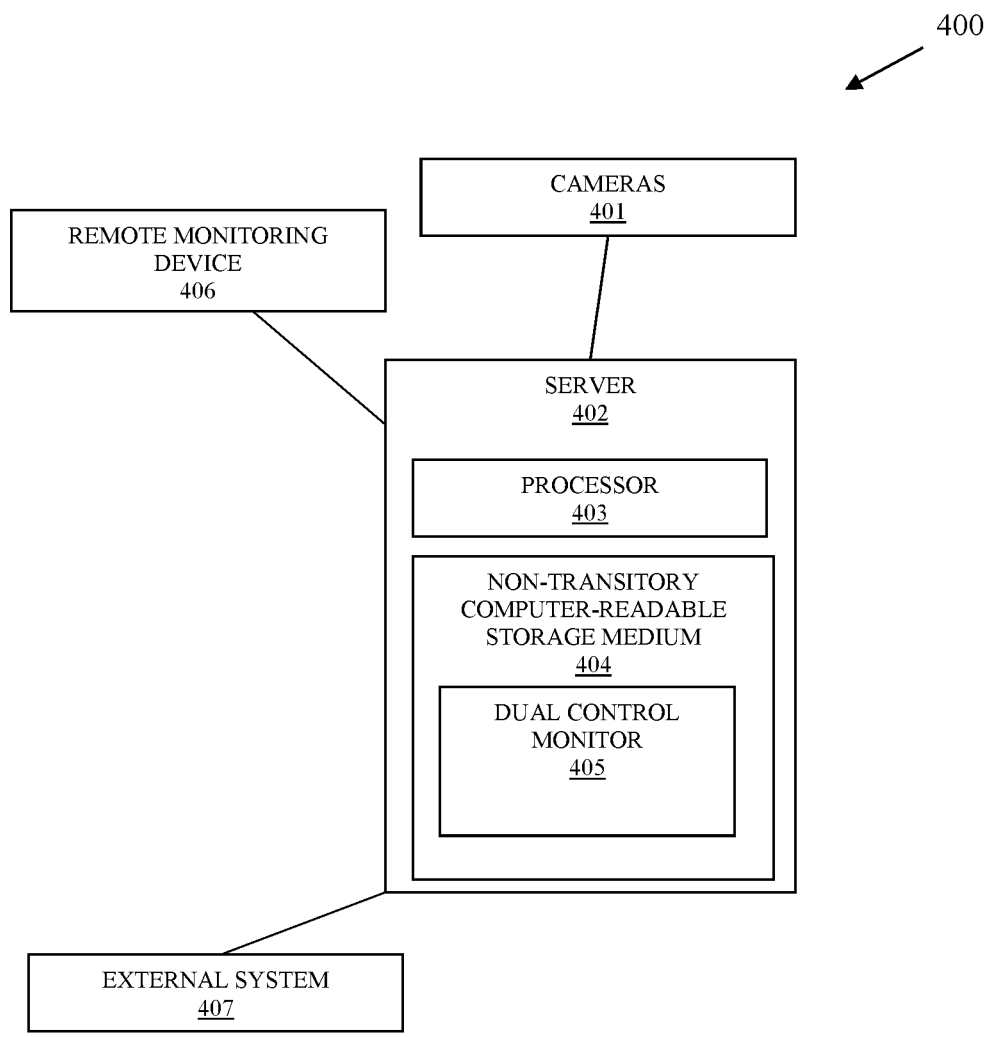
FIG. 4 is a diagram of another system for dual control security processing, according to an example embodiment.

FIG. 4 is a diagram of a system 400 for dual control security processing, according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 implements, inter alia, the processing described above with the FIGS. 1-3.

The system 400 includes a plurality cameras 401, a server 402, a remote monitoring device 406, and an external system 407. The server 402 includes at least one hardware processor 403, a non-transitory computer-readable storage medium 404 having executable instructions representing a dual control monitor 405.

The dual control monitor 405 when executed from the non-transitory computer-readable storage medium 404 on the processor 403 is configured to cause the processor 403 to perform processing comprising: 1) detecting an event associated with an access of an individual to: a secure asset, a secure zone within the establishment or a secure type of a transaction; 2) capturing video from the cameras 401 of the individual during the access; 3) engaging a remote agent associated with the remote monitoring device 406 to monitor the access from the remote monitoring device 406; 4) streaming the video to the remote monitoring device 406; 5) detecting violations to a dual control security policy based on actions and behaviors of the individual determined from the video during the access; 6) receiving second violations identified by the remote agent from the remote monitoring device 406; 7) labeling data associated with at least the actions, the behaviors, the individual, the remote agent, the violations, and the second violations in an audit data set; and 8) indexing the video to the audit data set.

In an embodiment, the dual control monitor 405 when executed from the non-transitory computer-readable storage medium 404 on the processor 403 is configured to further cause the processor 403 to perform additional processing comprising one or more of: 8) monitoring the remote agent for second actions and second behaviors from second video received from a camera associated with the remote monitoring device 406; 9) labeling the second actions and the second behaviors; 10) indexing the second video to the second actions and the second behaviors; and 11) linking the second video as labeled and as indexed to the audit data set.

In an embodiment, the dual control monitor 405 is all of or some combination of: 124-128A-B, the method 200, and/or the method 300.

In an embodiment, the remote monitoring device 406 is a remote operated device 150 comprising compliance interface 151 that interacts over a network connection with dual control monitor 405.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
   detecting an event associated with initiation of dual control security policies;
   identifying an individual associated with an access of a secure asset, a secure zone or performance a specific type of transaction;
   engaging a remote agent that is remote from the individual as a monitor for the access in accordance with the dual control security policies;
   capturing at least real-time video of at least the individual during performance of the access;
   providing the real-time video to the remote agent;
   tracking actions and behaviors of the individual by maintaining a person bounding box for the individual within frames of the real-time video, maintaining an asset bounding box for the secure asset within the frames of the real-time video, and using identifiers for the actions and the behaviors to identify the individual, the actions, and the behaviors based on analysis of the person bounding box and the asset bounding box tracked within the frames; and
   recording the actions and the behaviors of the individual from the real-time video in an audit data set until the access is completed.

2. The method of claim 1 further comprising, streaming the real-time video to a third-party security monitor during the access.

3. The method of claim 1 further comprising, obtaining violations documented in the audit data set and training a machine-learning algorithm for detecting the violations based on providing the real-time video, the actions and the behaviors as input and providing the violations as expected output to the machine-learning algorithm.

4. The method of claim 3 further comprising, iterating back to the detecting for a different access and a different event and processing the machine-learning algorithm as the remote agent.

5. The method of claim 1, wherein detecting further includes identifying the event based on: a request received from the individual, an authentication requested by the individual, a specific action performed by the individual in the video, a zone identifier for the secure zone, a secure asset identifier for the secure asset, or a type of the transaction.

6. The method of claim 1, wherein engaging further includes identifying the remote agent based on a request received from the individual.

7. The method of claim 1, wherein engaging further includes initiating the remote agent as a trained machine-learning algorithm.

8. The method of claim 1, wherein engaging further includes providing an interface to the remote agent on a remote device operated by the remote agent.

9. The method of claim 8, wherein recording further includes randomly presenting challenges to the remote agent through the interface ensuring the remote agent is focusing on the real-time video.

10. The method of claim 9, wherein recording further includes obtaining second real-time video captured by a camera associated with the remote device and monitoring the remote agent for second actions and second behaviors in accordance with the dual control security policies.

11. The method of claim 9, wherein recording further includes receiving confirmations or violations associated with the access from the remote agent through the interface based on the video presented on the remote device to the remote agent.

12. A method, comprising:
   detecting initiation of a dual control access session associated with an individual that is attempting to access a controlled asset, a controlled zone within an establishment, or attempting to perform a controlled type of transaction;
   obtaining a process control defining dual control security policies for the dual control access session;
   engaging a remote agent as a monitor and as a remote participant in the dual control access session;
   capturing video of the individual during the dual control access session and identifying actions and behaviors of the individual from the video by tracking the individual within a person bounding box maintained within frames of the video, tracking the secure asset within a secure asset bounding box maintained within the frames of the video, and using identifiers to identify the actions and the behaviors by performing analysis on the person bounding box and the secure asset bounding box tracked within the frames;
   streaming the video in real time to a remote device associated the remote agent; and
   generating an audit data set upon completion of the dual control access session at least representing the actions and the behaviors.

13. The method of claim 12 further comprising identifying violations of the dual control security policies from the audit data set.

14. The method of claim 13 further comprising, indexing the violations to a video clip derived from the video.

15. The method of claim 14 further comprising providing the video clip with the violations to a training system.

16. The method of claim 12 further comprising labeling the actions, the behaviors, correctly performed and required actions, and violations within the audit data set.

17. The method of claim 12, wherein engaging further includes monitoring the remote agent from second video captured by one or more cameras associated with the remote device.

18. The method of claim 12, wherein generating further includes generating the audit data set upon completion of the dual control access session with the audit data set comprising: a date and time stamp, a control identifier for the controlled asset, the controlled zone, or the controlled type of transaction, an individual identifier for the individual, a remote agent identifier for the remote agent, a remote device identifier for the remote device, action identifiers for actions of the individual detected during the dual control access session, behavior identifiers for behaviors of the individual during the dual control access session, violation identifiers for any violations detected during the dual control access session, confirmation identifiers for confirmations received from the remote agent during the dual control access session, and a link to a video clip from the video corresponding to the dual control access session and indexed to the action identifiers, the behavior identifiers, the violation identifiers, and the confirmation identifiers.

19. A system, comprising:
cameras configured to capture videos outside an establishment and inside the establishment;
a remote monitoring device;
a server comprising a processor and a non-transitory computer-readable storage medium;
the non-transitory computer-readable storage medium comprising executable instructions representing dual control monitor;
the dual control monitor when executed on the processor from the non-transitory computer-readable storage medium causing the processor to perform processing comprising:
 detecting an event associated with an access of an individual to: a secure asset, a secure zone within the establishment or a secure type of a transaction;
 capturing video from the cameras of the individual during the access;
 engaging a remote agent associated with the remote monitoring device to monitor the access from the remote monitoring device;
 streaming the video to the remote monitoring device;
 detecting violations to a dual control security policy based on actions and behaviors of the individual determined from the video during the access by tracking the individual within a person bounding box maintained within frames of the video, tracking the secure asset within a secure asset bounding box maintained within the frames of the video, and using identifiers to identify the actions and the behaviors by performing analysis on the person bounding box and the secure asset bounding box tracked within the frames;
 receiving second violations identified by the remote agent from the remote monitoring device;
 labeling data associated with at least the actions, the behaviors, the individual, the remote agent, the violations, and the second violations in an audit data set; and
 indexing the video to the audit data set.

20. The system of claim 19, wherein the dual control monitor when executed on the processor from the non-transitory computer-readable storage medium further causing the processor to perform additional processing comprising one or more of:
 monitoring the remote agent for second actions and second behaviors from second video received from a camera associated with the remote monitoring device;
 labeling the second actions and the second behaviors;
 indexing the second video to the second actions and the second behaviors; and
linking the second video as labeled and as indexed to the audit data set.

* * * * *